United States Patent [19]

Kasukawa

[11] Patent Number: 4,526,431
[45] Date of Patent: Jul. 2, 1985

[54] CONNECTOR WITH MECHANISM FOR COUPLING AND UNCOUPLING PLURALITY OF BLOCKS

[75] Inventor: Yasuhiko Kasukawa, Tokyo, Japan

[73] Assignee: NEC Corporation, Tokyo, Japan

[21] Appl. No.: 579,277

[22] Filed: Feb. 13, 1984

[30] Foreign Application Priority Data

Feb. 14, 1983 [JP] Japan .................................. 58-22349

[51] Int. Cl.³ ........................................ H01R 13/635
[52] U.S. Cl. ................................ 339/45 R; 339/91 R; 339/205
[58] Field of Search ................. 339/91 R, 45 R, 45 M, 339/46, 204, 205; 350/96.2, 96.21

[56] References Cited

U.S. PATENT DOCUMENTS 3,933,406  1/1976  Cameron et al. ................. 339/91 R
4,392,706  7/1983  Baker et al. ....................... 339/91 R

FOREIGN PATENT DOCUMENTS 2408232  6/1979  France ............................... 339/91 R Primary Examiner—John McQuade
Attorney, Agent, or Firm—Laff, Whitesel, Conte & Saret

[57] ABSTRACT

A connector including at least two connector blocks, first connector block and second connector block, which may be employed to interconnect fiber optic cables or electrical cables. A pair of frame-like lugs on a housing of the first connector block are engageable with a pair of flexible arms on a housing of the second connector block to couple the two connector blocks to each other. A housing of one of the connector blocks is provided with members which are resiliently deformable when engaged with part of a housing of the other connector block. When sliders which are also furnished with on the first connector block are engaged with the flexible arms of the second connector block, the connector blocks are uncoupled from each other due to restoring forces exerted by the resilient deformable members.

12 Claims, 12 Drawing Figures

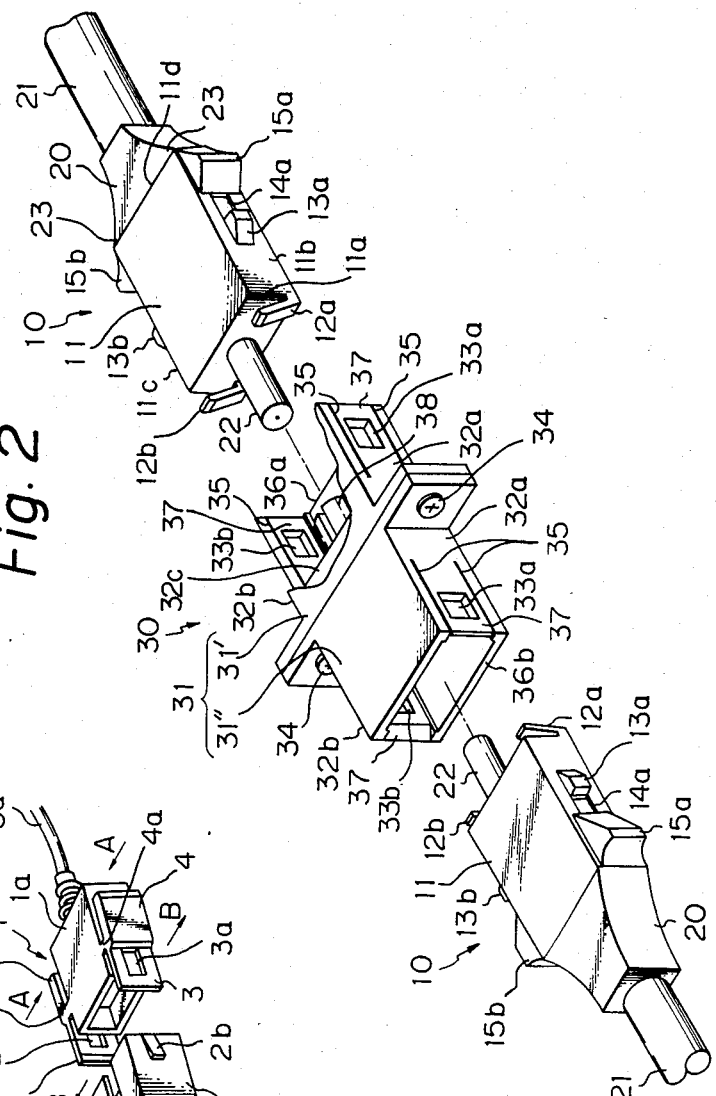
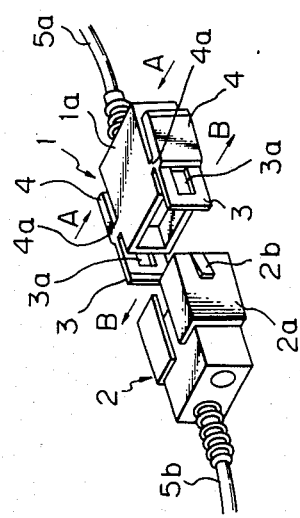
Fig. 1 PRIOR ART
Fig. 2

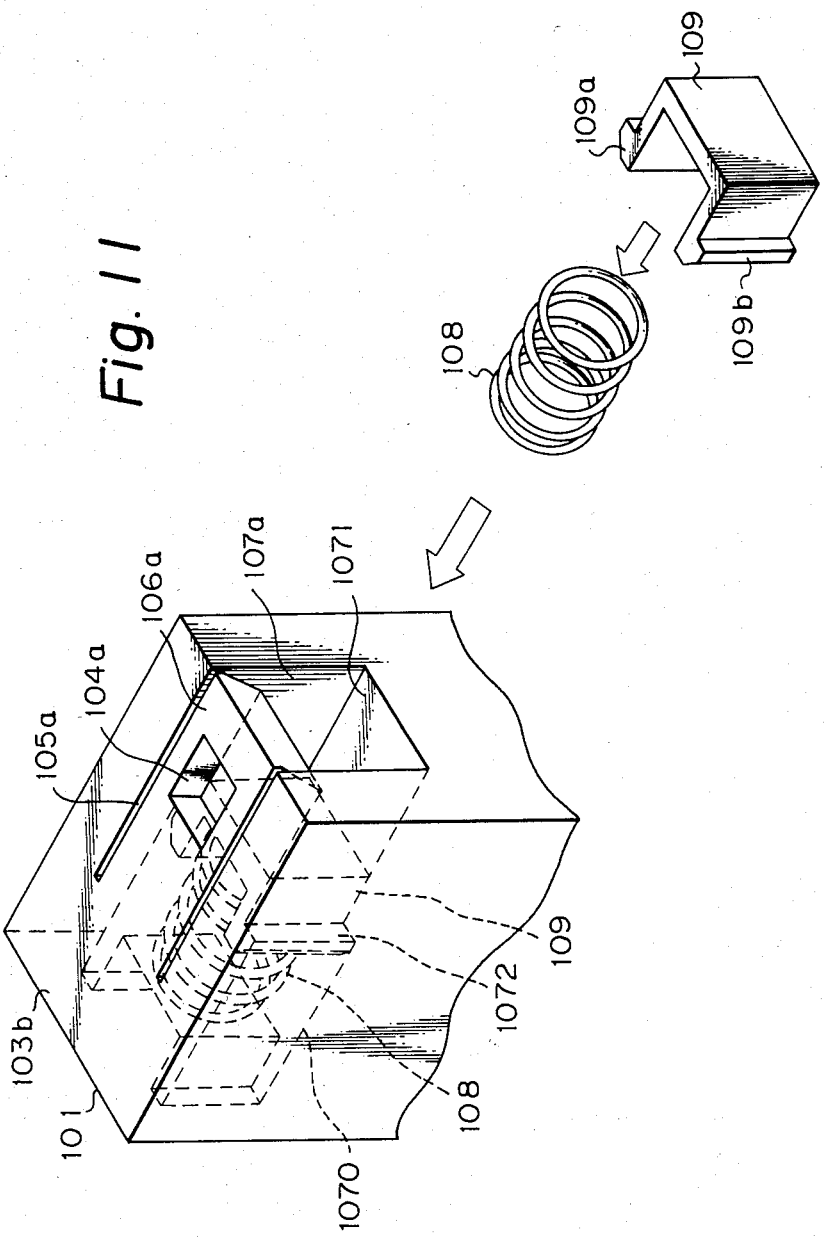

CONNECTOR WITH MECHANISM FOR COUPLING AND UNCOUPLING PLURALITY OF BLOCKS

BACKGROUND OF THE INVENTION

The present invention relates to a connector for fiber optic cables or electrical cables and, more particularly, to a mechanism for coupling and uncoupling a plurality of connector blocks which constitute the connector.

Connectors are installed in various communications systems to interconnect fiber optic cables or electrical cables along which various signals propagate. A connector of the type described usually comprises first connector blocks serving as plug portions and a second connector blocks serving as a jack or adapter portion. It is a primary requisite that the first and second connector blocks be coupled in such a manner as to insure reliable connection between the cables, or signal transmission paths, both electrically and mechanically. Meanwhile, the interconnected first and second connector blocks have to be readily uncoupled from each other without recoursing to any special tool, whenever a need arises to modify the signal transmission paths or to inspect or maintain them.

Connectors of the above-described type heretofore proposed for fiber optic cables include one which will be described later with reference to FIG. 1 of the drawing. An example of connectors designed for use with electrical cables is disclosed in U.S. Pat. No. 3,933,406 (Cameron et al). All these prior art connectors include flexible arms engageable with lugs which are formed on the other connector blocks, and operating arms which extend in the opposite direction to the respective flexible arms with respect to fulcrum portions. To uncouple coupled connector blocks, the operating arms are manually depressed to move the flexible arms apart in interlocked relation therewith. A problem heretofore encountered with such a connector is that substantial loads tend to act on the fulcrum portions to damage them, while a relatively great and continuous effort has to be applied from outside to uncouple the connector blocks. Further, the connector described above is quite susceptive to externally derived destructive forces such as a catching force.

SUMMARY OF THE INVENTION

It is therefore an object of the present invention to provide a connector with a coupling and uncoupling mechanism which allows a plurality of coupled connector blocks to be uncoupled by a minimum of effort and prevents them from being easily damaged by local fatigue or undue external forces.

It is another object of the present invention to provide a connector with a coupling and uncoupling mechanism which requires only a momentary application of effort for uncoupling a plurality of connector blocks.

It is another object of the present invention to provide a generally improved connector with a coupling and uncoupling mechanism.

A connector for coupling and uncoupling a plurality of connector blocks of the present invention comprises a first connector block having a housing which is provided, on a pair of opposite side walls thereof, with a pair of outwardly extending lugs and a pair of sliders which are individually movable along said opposite walls, a second connector block having a housing which is provided, on a pair of opposite walls thereof, with a pair of frame-like flexible arms which are respectively engageable with the lugs on the first connector block, and a resilient of deformation member for exerting a restoring force to cancel a coupled condition between the first and second connector blocks when the sliders of the first connector block are brought into engagement with the flexible arms of the second connector block, the resilient deformation member being resiliently deformed in contact with part of one of the first and second connector blocks when the first and second connector blocks are coupled with each other with the lugs and the flexible arms engaged with each other.

In accordance with the present invention, a connector includes at least two connector blocks, first connector block and second connector block, which may be employed to interconnect fiber optic cables or electrical cables. A pair of frame-like lugs on a housing of the first connector block are engageable with a pair of flexible arms on a housing of the second connector block to couple the two connector blocks to each other. A housing of one of the connector blocks is provided with members which are resiliently deformable when engaged with part of a housing of the other connector block. When sliders which are also furnished with on the first connector blocks are engaged with the flexible arms of the second connector block, the connector blocks are uncoupled from each other due to restoring forces exerted by the resilient deformable members.

The above and other objects, features and advantages of the present invention will become more apparent from the following detailed description taken with the accompanying drawings.

BRIEF DESCRIPTION OF THE DRAWING

FIG. 1 is an exploded perspective view of a prior art connector;

FIG. 2 is a partly taken away exploded perspective view of a connector embodying the present invention;

FIG. 11 is a detailed view of a recess formed in a housing of FIG. 10.

DESCRIPTION OF THE PREFERRED EMBODIMENTS

Figure 3:
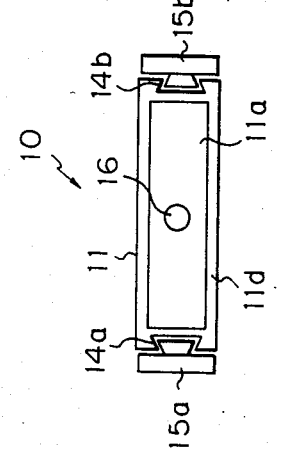
FIG. 3 is a side elevation of a plug housing included in the connector of FIG. 2.

While the connector with a coupling and uncoupling mechanism of the present invention is susceptible of numerous physical embodiment, depending upon the environment and requirements of use, substantial numbers of the herein shown and described embodiments have been made, tested and used, and all have performed in an eminently satisfactory manner.

To facilitate understanding of the present invention, a brief reference will be made to a coupling and uncoupling mechanism of a prior art connector, depicted in FIG. 1. The connector is applied to fiber optic cables 5a and 5b by way of example. The fiber optic cable 5a is securely retained by and in a housing 1a of a first connector block 1, while the fiber optic cable 5b is securely retained by and in a housing 2a of a second connector block 2. The connector blocks 1 and 2 are interconnected by a pair of flexible frame-like arms 3 and a pair of single ramp members 2b. Each of the arms 3 is formed with a window 3a for receiving corresponding one of the single ramp members 2b. To unlock or unlatch the connector block 1 and 2 from each other, a pair of lever arms 4 respectively extending rearwardly from the flexible arms 3 are pressed at the same time as indicated by arrows A in order to move the arms 3 apart, each arm moving about a fulcrum 4a in the directions indicated by the arrows B. Then, the first connector block 1 is pulled out of the second connector block 2.

Referring to FIG. 2, a connector in accordance with the present invention is shown which is adapted to connect a pair of fiber optic cables. As shown, the connector comprises a pair of first connector blocks 10 which individually serve as plugs of the connector. Each of the first connector blocks 10 is made up of a plug housing 11 and a holder 20 for holding its associated fiber optic cable. The plug housing 11 comprises a single molding of plastic which includes a pair of resilient arms (leaf springs) 12a and 12b each extending from a first side wall 11a of the housing 11 with a predetermined inclination from a fixed end to a free end thereof. The molding also includes a pair of lugs 13a and 13b which are positioned on opposing second and third side walls 11b and 11c and each of which is formed with a single ramp. The second and third walls 11b and 11c of the plug housing 11 are respectively formed with recesses or channels 14a and 14b (only 14a is shown) extending from the positions of their associated lugs 13a and 13b over to an open side 11d of the housing 11. The channels 14a and 14b commonly have a trapezoidal cross-section. During assembly, sliders 15a and 15b are respectively engaged in the channels 14a and 14b to be slidable therealong. The configuration of the channels 14a and 14b and positional relationship between the channels 14a and 14b and the sliders 15a and 15b are best shown in FIG. 3, which is a view of the plug housing as seen from the open side 11d. It will be understood from FIG. 3 that the plug housing 11 is formed with a circular opening 16 through the first side wall 11a and has a generally hollow rectangular, bottomed configuration with the open side 11d.

Referring again to FIG. 2, the holder 20 includes a ferrule 22 formed with a through bore of a very small diameter in order to retain a core of a fiber optic cable 21. The holder 20 is coupled in the open side 11d of the plug housing 11 and rigidly connected thereto by means of, for example, an adhesive or a known projection and recess device. A flared end 23 of the holder 20 serves to prevent the sliders 15a and 15b from slipping out of their associated channels 14a and 14b.

As shown in FIG. 2, a second connector block, generally 30, comprises an adapter housing 31 made up of a pair of identically shaped housing parts 31' and 31" which are fastened together by means of fastening members 34. Such an adapter housing structure 31 is desirable, but not limitative, because molding the housing parts 31' and 31" individually by use of a mold simplifies the configuration of the mold. The adapter housing 31 is formed with windows 33a and 33b through first and second opposing side walls 32a and 32b and adjacent to opposite ends thereof. Parallel slits 35 extend above and below each of the windows 33a and 33b and from opposite open sides 36a and 36b of the housing 31 toward the intermediate fastened portion of the housing parts 31' and 31". Therefore, a specific portion of each side wall 32a or 32b which is delimited by the parallel slots 35 around the window 33a or 33b constitutes a generally frame-like flexible arm 37.

In the housing 31, a cylindrical split sleeve 38 extends from a wall 32c of each housing part 31' or 31" which is located at the fastened portion of the two housing parts. Although not shown in FIG. 2, the sleeves 38 extending inside the housing parts 31' and 31" are intercommunicated by a bore. The first connector blocks 10 and the second connector block 30 each constructed in the manner described are coupled to each other with a center axis thereof defined by the ferrules 22 and split sleeves 38.

Figure 4:
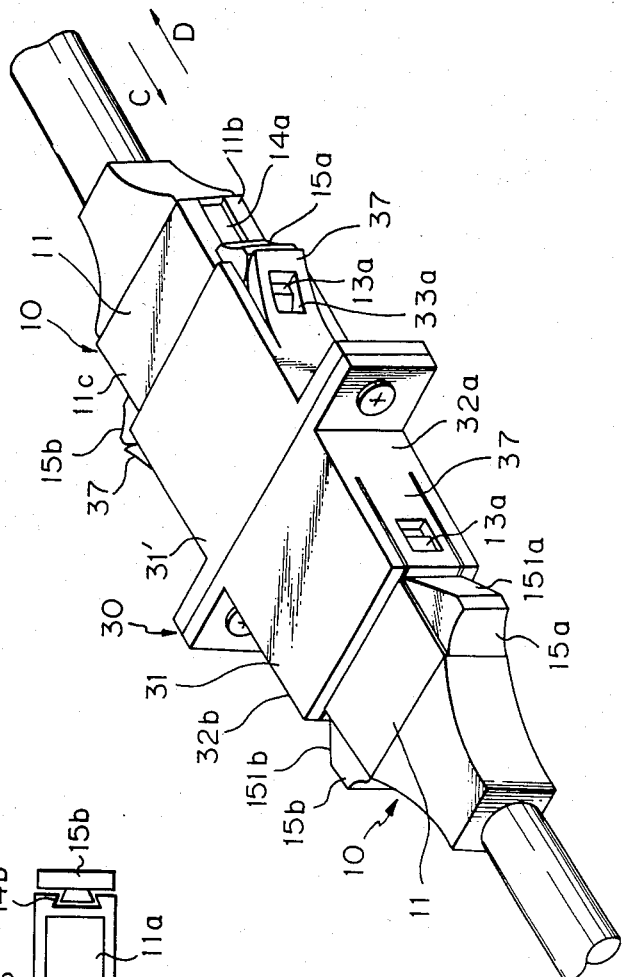
FIG. 4 is a perspective view of the connector of FIG. 2 which is shown in a coupled position.

Reference will be made to FIG. 4 which illustrates the above-described connector in a coupled condition. The connector blocks 10 are firmly connected to the connector block 30 with the lugs 13a and 13b on their plug housings 11 respectively received in the windows 33a and 33b (33b is not shown), which are formed in the side walls 32a and 32b of the adapter housing 31. To uncouple the connector, the sliders 15a and 15b paired with each other are simultaneously moved in a direction indicated by an arrow C so that forward ramps 151a and 151b of the sliders 15a and 15b individually urge the opposite flexible arms 37 away from each other. This releases the lugs 13a and 13b of the connector block 10 from the windows 33a and 33b of the connector block 30 and, at the same time, causes the connector block 10 to recede as indicated by an arrow D due to the repulsive forces of the resilient arms 12a and 12b (see FIG. 2), thereby unlocking the connector block 10 from the connector block 30.

Figure 5:
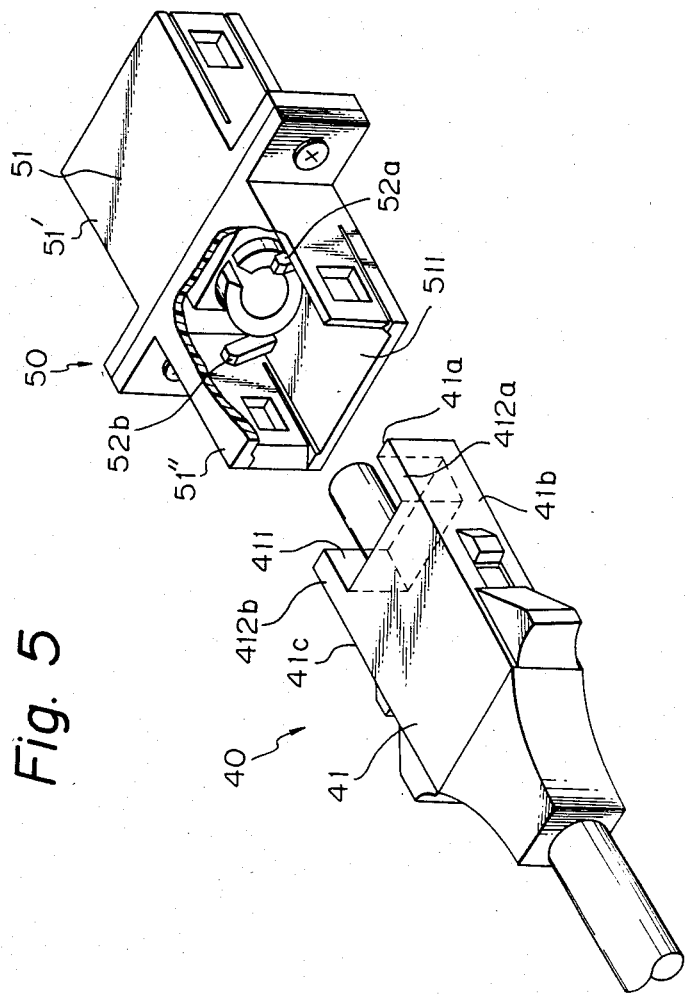
FIG. 5 is a partly taken away exploded perspective view of a second embodiment of the present invention.

Referring to FIG. 5, a second embodiment of the present invention is shown which is a modified version of the first embodiment described above. A first connector block or plug, generally 40, and a second connector block or adapter, generally 50, and a coupling and uncoupling mechanism therefor are identical in construction with those shown and described in conjunction with the first embodiment except for the following modifications. In FIG. 5, a first side wall 41a of a plug housing 41 is recessed as at 411 to form a projection 412a at an end of a second side wall 41b and a projection 412b at an end of a third side wall 41c. The second connector block 50 comprises a pair of housing parts 51' and 51" which constitute an adapter housing 51 in combination. In each of the housing parts 51' and 51", a pair of resilient arms 52a and 52b extend from an inner bottom wall 511 with a predetermined inclination and are molded integrally therewith. Although not shown in the drawing, the other housing part 51' is identical with the counterpart 51" concerning the construction and arrangement of the bottom wall 511 and the resilient arms 52a and 52b extending therefrom.

When the first connector block 40 having the above configuration is inserted into the second connector block 50, the projections 412a and 412b of the plug housing 41 abut against the corresponding resilient arms 52a and 52b to urge them from the inclined position to a substantially upright position. When the first connector block 40 is uncoupled from the second connector block 50, the projections 412a and 412b of the former are effected by the restoring (repulsive) forces exerted by the resilient arms 52a and 52b of the latter. Although not shown in the drawing, another first connector block 40 will be detachably coupled with the adapter housing 51 of the second connector block 50 in the manner the first connector block 40 is done.

In the construction shown in FIG. 5, sliders on the first connector block 40 which constitute an uncoupling or unlocking mechanism are arranged in the same manner as those on the connector block in accordance with the first embodiment. However, due to the pair of resilient arms 52a and 52b in the housing 51 of the second connector block 50, the connector of FIG. 4 achieves an additional advantage that it is free from damage which might result from unexpected external forces or undue manipulations for coupling and uncoupling the blocks.

Figure 6:
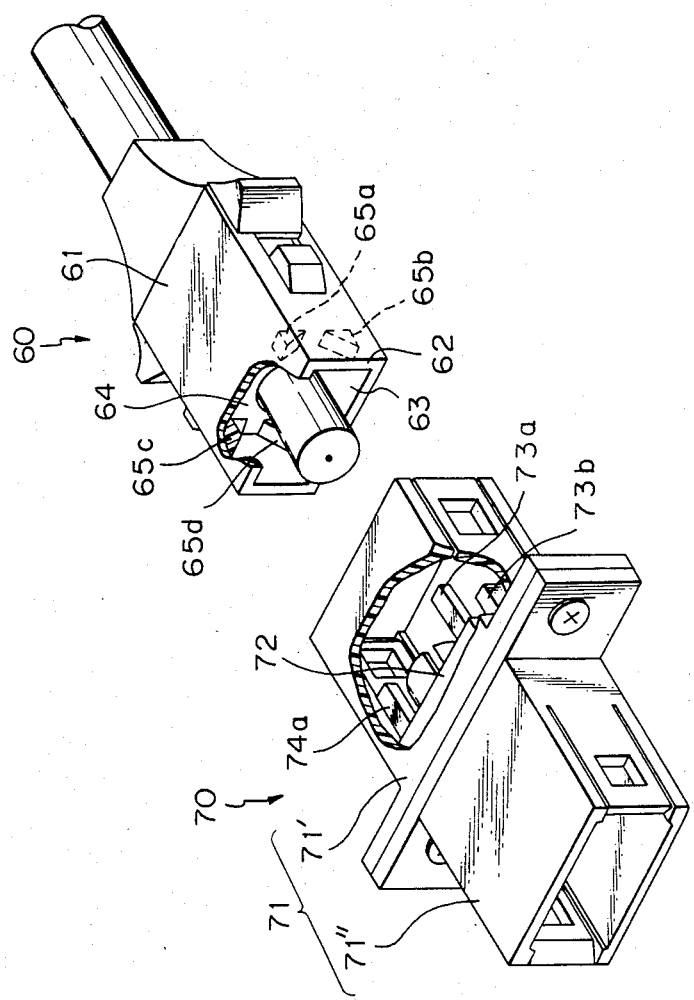
FIG. 6 is a partly taken away exploded perspective view of a third embodiment of the present invention.

Referring to FIG. 6, a third embodiment of the present invention is shown which constitutes a modification to the first and second embodiments described. The third embodiment is identical with the first and second embodiments concerning the construction of the connector blocks and the coupling and uncoupling mechanism therefor, except for the following points. In FIG. 6, a first connector 60 comprises a plug housing 61 which is formed with a recess 63 in a first side wall 62 thereof. Ramp portions 65a, 65b, 65c and 65d are formed integrally with an inner wall 64 of the recess 63. Meanwhile, a second connector block 70 comprises an adaptor housing 71 which is made up of housing parts 71' and 71''. In each of the housing parts 71' and 71'', two parts of resilient arms 73a, 73b, 74a and 74b (74b is not shown) individually extend straight from a wall 72 where the housing part connects to the counterpart. Although not shown in the drawing, the other housing part 71'' is provided with resilient arms identical with the resilient arms 73a, 73b, 74a and 74b on a wall where it connects to the housing part 71'.

Figure 7A:
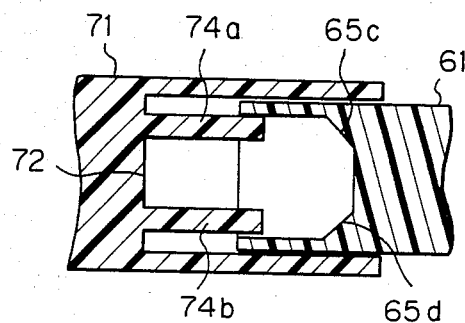
FIGS. 7A and 7B are sections demonstrating deformation of resilient arms included in the construction shown in FIG. 6.
Figure 7B:
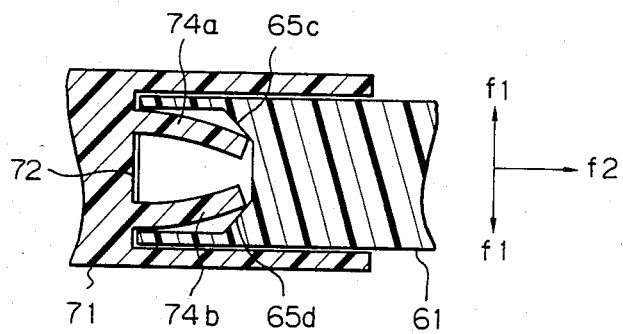

When the first connector block 60 shown in FIG. 6 is inserted into the second connector block 70, the ramp portions 65a and 65 respectively abut against the resilient arms 73a and 73b of the adapter housing 71, and the ramp portions 65c and 65d against the resilient arms 74a and 74b. Referring also to FIGS. 7A and 7B, before the housings 61 and 71 are fully coupled together, the resilient arms 73a, 73b, and 73d remain straight on the wall 72 as illustrated in FIG. 7A. However, on full engagement of the housings 61 and 71, the arms 73a–74d are individually deformed or bent in conformity to the configuration of the ramp portions 65a, 65b, 65c and 65d, as illustrated in FIG. 7B. In the deformed condition, the arms 74a and 74b tend to move away from each other as indicated by arrows $f_1$ so as to restore their unstressed positions, and so do the other arms 73a and 74b although not shown in the drawing. Because the free ends of the arms 73a–74b are respectively abutted against the ramp portions 65a–65d inside the plug housing 61, a repulsive force is imparted to the plug housing 61 as indicated by an arrow $f_2$. When the first connector block 60 is uncoupled from the connector block 70, the repulsive force $f_2$ urges the connector block 60 outwardly of the connector block 70. Another first connector block 60 will be plugged into the second connector block 70, although not shown in FIG. 6.

The connector assembly in accordance with the third embodiment facilitates separation of the connector blocks due to a repulsive force of each resilient arm which is even larger than the repulsive force attainable with the first or second embodiment.

Figure 8:
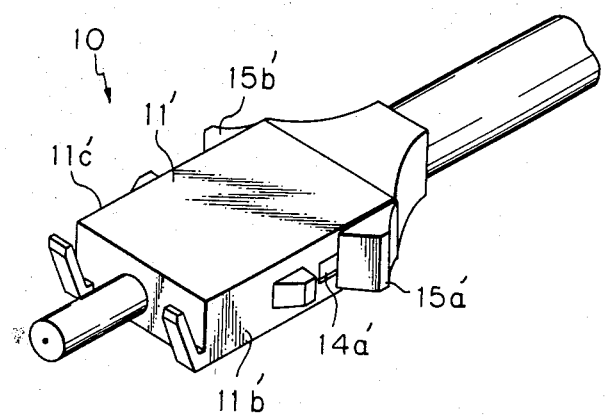
FIG. 8 is a perspective view of a first connector block representing a fourth embodiment of the present invention.
Figure 9:
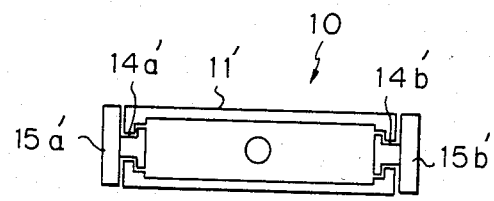
FIG. 9 is a side elevation of a plug housing shown in FIG. 8.

Referring to FIGS. 8 and 9, a fourth embodiment of the present invention is shown which is similar to the first embodiment except for the configuration of the first connector block. The first connector block 10 in this embodiment, unlike the first connector block in the first embodiment, includes rectangular openings 14'a and 14'b which are formed through opposite second and third side walls 11'b and 11'c of a plug housing 11' in place of the channels 14a and 14b shown in FIGS. 2 and 3. The plug housing 11' comprises a hollow rectangular member made of plastic. Sliders 15'a and 15'b are movably received in the openings 14'a and 14'b respectively. The rest of the construction is identical with the construction in accordance with the first embodiment. It will be noted that the plug housing 41 of the first connector block 40 in the second embodiment or the plug housing 61 of the first connector block 60 in the third embodiment may be modified as shown in FIG. 8.

While the present invention has been shown and described in conjunction with a connector for fiber optic cables, it is similarly applicable to other kinds of connectors which require a coupling and uncoupling mechanism of the kind described.

Figure 10:
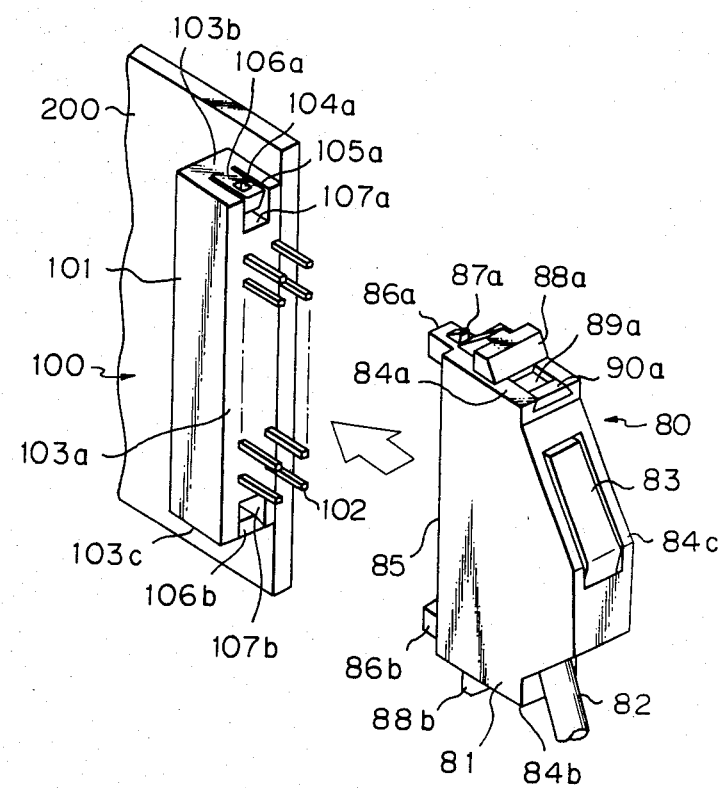
FIG. 10 is an exploded perspective view of a fifth embodiment of the present invention.

Referring to FIGS. 10 and 11, a fifth embodiment of the present invention is show which is applied to electrical cables. As shown, a first connector block 80 constitutes a female connector for an electrical cable and houses therein a female connector member 83, to which an end of a multicore cable 82 is connected. Although not shown, but as well known in the art, the female connector member 83 is provided with a plurality of female terminals which are engageable with male terminals which will be inserted into the first connector block 80 from outside. The connector block 80 has a single open side 85 and a first side wall 84a and a second side wall 84b adjacent to the open side portion 85, the side walls 84a and 84b facing each other as illustrated. Each of the side walls 84a and 84b is provided with lugs 86a and 86b each extending forwardly beyond the open side 85, a single latch or ramp projection 87a is formed integrally with the lug 86a. A similar latch or ramp projection is formed on the lug 86b, the latch being at a point which is not visible in FIG. 10. A recess or channel 89a, having a trapezoidal cross-section and extending toward a third side wall 84c receives a slider 88a which is movably engaged in the channel 89a. A similar channel enables slider 88b to move; however, that similar chanel is not visible in FIG. 10. A stop 90a is fit in the end of the channel 89a to keep the slider 88a in the channel. A similar stop limits the travel of slider 88b, that similar stop not being visible in FIG. 10.

Meanwhile, as shown in FIG. 10, a second connector block 100 is securely mounted on a printed circuit board 200 of a desired apparatus with, for example, one end of each male terminal 102 connected to the printed circuit board 200. Constituting a male connector section of the connector, the second connector block 100 comprises a housing 101 which is made of plastic and has a first side wall 103a. The other end of each of the male terminals 102 protrudes from the first side wall 103a to be engageable with a female terminal mounted on the female connector 83. Second and third side walls 103b and 103c contiguous with the first side wall 103a are respectively formed with windows 104a and 104b (104b is not shown) and slits 105a and 105b (105b) is not shown). The window 104a and its associated slots 105a cooperate to form a flexible arm 106a, while the window 104b and its associated slots 105b cooperate to form a flexible arm 106b. The second and third walls 103b and 103c are recessed as at 107a and 107b respectively.

Details of the flexible arms 106a and 106b and recesses 107a and 107b will be understood from FIG. 11. The flexible arm 106b and recess 107b which are not shown in FIG. 11 are identical in structure with the flexible arm 106a and recess 107a. Disposed inside the recess 107a of the housing 101 are a coil spring 108 and a generally U-shaped retainer 109 adapted to prevent the coil spring 108 from slipping out of the recess 107a. The retainer 109 is positioned in a bore 1070 which is contiguous with and wider than the rest of the recess 107a, while retaining one end of the coil spring 108. Although constantly biased by the spring 108 outwardly of the recess 107a, the retainer 109 is kept thereinside because its flaps 109a and 109b abut against opposite shoulders 1072 of the housing 101, which are defined between the wider bore 1070 and a narrower bore 1071 of the recess 107a.

The connector blocks 80 and 100 having the above construction are coupled together by inserting the lug 86a of the connector block 80 into the recess 107a of the connector block 100, and the lug 86b into the recess 107b, until the single ramp projection 87a engages in the window 87a and the single ramp projection 87b in the window 104b. When the slider 88a and 88b on the connector block 80 are simultaneously moved forwardly to force their associated flexible arms 106a and 106b to open, the repulsive forces of the coil springs 108 in the recesses 107a and 107b are respectively imparted to the lugs 86a and 86b through the retainers 109. As a result, the connector block 80 is uncoupled from the connector block 100.

Various modifications will become possible for those skilled in the art after receiving the teachings of the present disclosure without departing from the scope thereof. For example, the arm members (leaf springs) integrally formed with the plastic housing by molding may be replaced by metal members which are mounted on the plastic housing. The present invention is also applicable as a coupling and uncoupling mechanism for any other kind of electrical part in which a housing may have a switching mechanism and the like thereinside.

What is claimed is:

1. A connector for coupling and uncoupling a plurality of connector blocks, comprising:
   a first connector block having a housing which is provided, on a pair of opposite walls thereof, with a pair of outwardly extending lugs and a pair of sliders which are individually movable along said opposite walls;
   a second connector block having a housing which is provided, on a pair of opposite walls thereof, with a pair of frame-like flexible arms which are respectively engageable with the lugs on the first connector block; and
   resilient deformation means for exerting a restoring force to cancel a coupled condition between the first and second connector blocks when the sliders of the first connector block are brought into engagement with the flexible arms of the second connector block, said resilient deformation means being resiliently deformed in contact with part of one of the first and second connector blocks when the first and second connector blocks are coupled with each other with the lugs and the flexible arms engaged with each other.

2. A connector as claimed in claim 1, in which the housings of the first and second connector blocks are individually made of plastic.

3. A connector as claimed in claim 1, in which the opposite walls of the housing of the first connector block are individually formed with slots, the sliders being respectively received in said slots.

4. A connector as claimed in claim 1, in which the opposite walls of the housing of the first connector block are individually formed with channels each having a trapezoidal cross-section, the sliders being respectively coupled in said trapezoidal channels.

5. A connector as claimed in claim 4, in which a wall of the housing of the second connector block which neighbors the opposite walls which are provided with the flexible arms is at least partly machined to have an opening, at least part of the housing of the first connector block being inserted through said opening into the housing of the second connector block.

6. A connector as claimed in claim 5, in which each of the flexible arms is formed by at least two slits each extending from the opening of the second connector block, and a through opening interposed between said slots to receive one of the lugs of the first connector block.

7. A connector as claimed in claim 6, in which the resilient deformation means comprises a leaf spring integral with a front wall of the housing of the first connector block which neighbors the opposite walls, said leaf spring extending from said front wall while being inclined from a fixed end to a free end thereof.

8. A connector as claimed in claim 6, in which the resilient deformation means comprises a leaf spring which is formed integrally with and projected from one of inner walls of the housing of the second connector block.

9. A connector as claimed in claim 8, in which the leaf spring functioning as the resilient deformation means extends from one of the inner walls of the housing of the second connector block while being inclined from a fixed end to a free end thereof.

10. A connector as claimed in claim 8, in which at least one pair of the leaf springs are provided to function as the resilient deformation means, said leaf springs individually extending substantially linearly from one of the inner walls of the housing of the second connector block toward the opening.

11. A connector as claimed in claim 10, in which a front wall of the housing of the first connector block adjacent to the opposite walls is provided with a recess having inclined wall portions which bend the at least one pair of leaf springs of the second connector block when the first and second connector blocks are coupled.

12. A connector as claimed in claim 6, in which the resilient deformation means comprises a coil spring disposed in a bore which is contiguous with the opening of the second connector block.

* * * * *